(12) United States Patent
Glaser et al.

(10) Patent No.: US 8,944,194 B2
(45) Date of Patent: Feb. 3, 2015

(54) DRIVE SYSTEM

(75) Inventors: Fritz Glaser, Zweibrücken (DE);
Nicolai Tarasinski, Frankenthal (DE);
Rainer Gugel, Mannheim (DE)

(73) Assignee: Deere & Company, Moline, IL (US)

( * ) Notice: Subject to any disclaimer, the term of this patent is extended or adjusted under 35 U.S.C. 154(b) by 1719 days.

(21) Appl. No.: 11/991,888

(22) PCT Filed: Aug. 25, 2006

(86) PCT No.: PCT/EP2006/065687
§ 371 (c)(1),
(2), (4) Date: Mar. 26, 2010

(87) PCT Pub. No.: WO2007/031396
PCT Pub. Date: Mar. 22, 2007

(65) Prior Publication Data
US 2010/0170732 A1    Jul. 8, 2010

(30) Foreign Application Priority Data

Sep. 15, 2005    (DE) .......................... 10 2005 044 181

(51) Int. Cl.
*B60K 6/46*    (2007.10)
*B60K 6/26*    (2007.10)
(Continued)

(52) U.S. Cl.
CPC ... *B60K 6/46* (2013.01); *B60K 6/26* (2013.01); *B60K 6/547* (2013.01); *B60W 10/06* (2013.01);
(Continued)

(58) Field of Classification Search
CPC ........... B60K 1/02; B60K 6/26; B60W 10/08; F16H 3/089; F16H 37/065; F16H 3/728; F16H 2200/0039; Y02T 10/6286; Y02T 10/52; Y02T 10/6217; B60Y 2200/221; B60Y 2200/41

USPC .......................................... 180/65.245, 65.22
See application file for complete search history.

(56) References Cited

U.S. PATENT DOCUMENTS 5,224,563 A    7/1993   Iizuka et al.
5,934,395 A *  8/1999   Koide et al. .............. 180/65.235
(Continued)

FOREIGN PATENT DOCUMENTS

DE    19749074         5/1999
DE    19749074 C2 *    8/2002
(Continued)

OTHER PUBLICATIONS

International Search Report of related Application No. PCT/EP2006/065687, mailed Dec. 29, 2006.

*Primary Examiner* — J. Allen Shriver, II
*Assistant Examiner* — Brian Cassidy
(74) *Attorney, Agent, or Firm* — Quarles & Brady LLP

(57) ABSTRACT

The invention relates to a drive system (10) for an agricultural or industrial vehicle, preferably a tractor (12). Said drive system (19) comprises at least one electric generator (24, 26) as well as a first and a second electric machine (28, 30). The at least one electric generator (24, 26) can be driven using torque generated by a vehicle engine (22). At least one of the two electric machines (28, 30) can be driven using the electric power generated by the electric generator (24, 26). The mechanical torque generated by the first and/or the second electric machine (28, 30) can be transmitted to at least one driving axle (14, 16) of the vehicle in order to allow the vehicle to move. The invention further relates to an agricultural vehicle comprising such a drive system (10).

23 Claims, 6 Drawing Sheets

Figure 1:
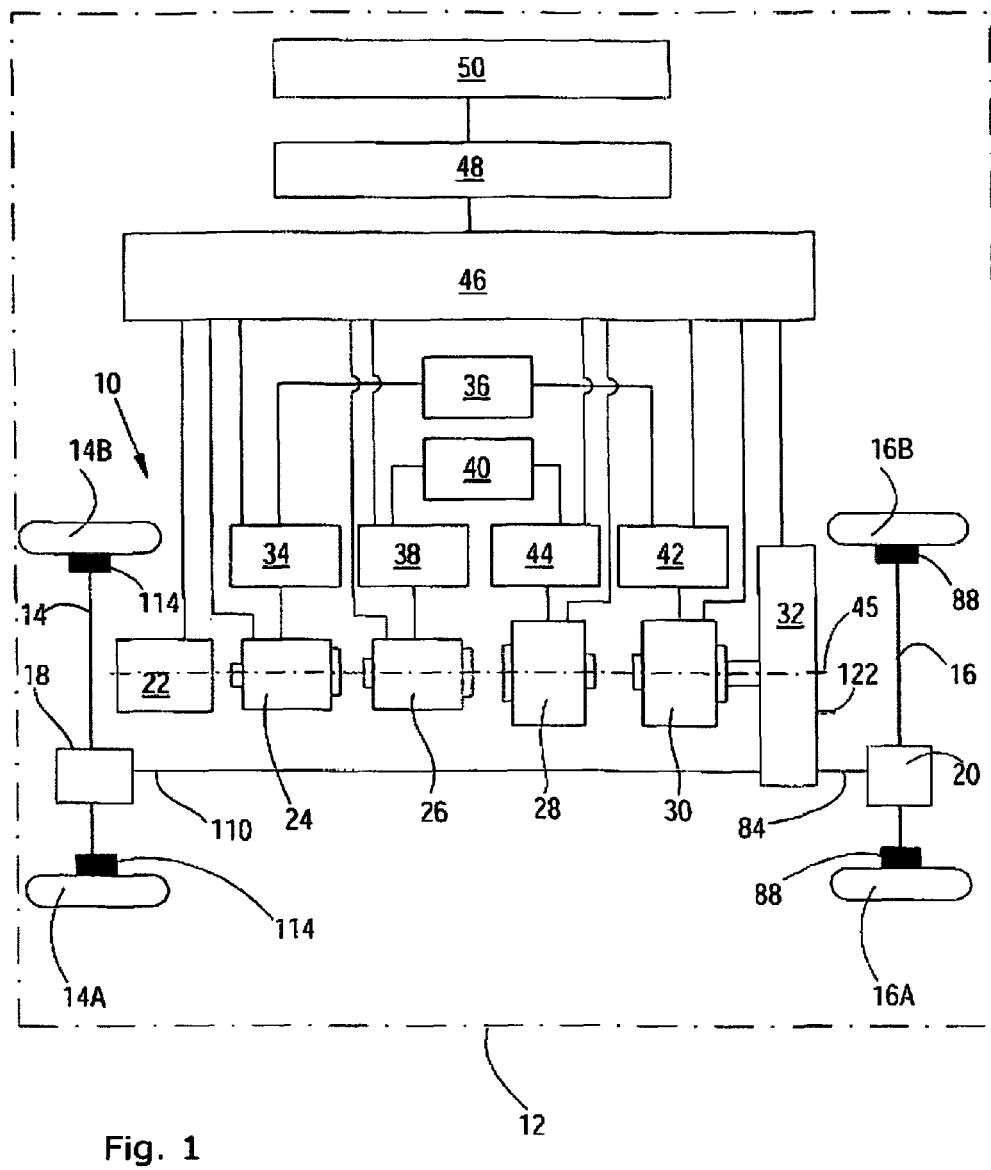

(51) Int. Cl.
*B60K 6/547* (2007.10)
*B60W 10/06* (2006.01)
*B60W 10/08* (2006.01)
*B60W 20/00* (2006.01)
*F16H 3/089* (2006.01)
*F16H 37/06* (2006.01)
*B60K 1/02* (2006.01)
*F16H 3/72* (2006.01)

(52) U.S. Cl.
CPC ............... *B60W 10/08* (2013.01); *B60W 20/00* (2013.01); *F16H 3/089* (2013.01); *F16H 37/065* (2013.01); *B60K 1/02* (2013.01); *B60Y 2200/221* (2013.01); *B60Y 2200/41* (2013.01); *F16H 3/728* (2013.01); *F16H 2200/0039* (2013.01); *Y02T 10/52* (2013.01); *Y02T 10/6217* (2013.01); *Y02T 10/6286* (2013.01)
USPC .................................................. 180/65.245

(56) References Cited

U.S. PATENT DOCUMENTS

| 5,947,855 | A | * | 9/1999 | Weiss | 475/5 |
| 5,988,307 | A | * | 11/1999 | Yamada et al. | 180/243 |
| 6,461,266 | B1 | * | 10/2002 | Weisz | 475/5 |
| 6,726,588 | B2 | * | 4/2004 | Weisz | 475/5 |
| 2002/0193197 | A1 | * | 12/2002 | Weisz | 475/5 |
| 2003/0205422 | A1 | * | 11/2003 | Morrow et al. | 180/65.2 |
| 2004/0204276 | A1 | * | 10/2004 | Tarasinski | 475/5 |
| 2005/0109549 | A1 | * | 5/2005 | Morrow | 180/65.2 |

FOREIGN PATENT DOCUMENTS

| EP | 1547840 | 6/2005 |
| FR | 2419832 | 10/1979 |

* cited by examiner

Key:
1    Percent torque MAXM/MINM
2    Percent rotational speed
3    25-100% rotational speed → optimal efficiency
4    100% power (hyperbola)

| Key: | 1 | Relative traction forces in 3 transmission ranges |
|---|---|---|
| | 2 | Relative traction |
| | 3 | Speed |
| | 4 | Transmission range |
| | 5 | Transmission ranges (mode 1, 2, 3) |
| | 6 | Two electric motors (100% power) |
| | 7 | One electric motor (50% power) |

DRIVE SYSTEM

The present invention relates to a drive system for an agricultural or industrial vehicle, preferably a tractor. The present invention further relates to an agricultural vehicle with such a drive system.

Electric drives are the state of the art in trains and streetcars. Electric drive systems have not yet established themselves in the motor vehicle field. The advantages of electric drives are the continuously variable propulsion over a large speed range. An electric motor can transfer its maximum power only over a maximum to minimum torque ratio (MAXM/MINM) of roughly 5 to 7. For an agricultural vehicle, a tractor for instance, a torque ratio MAXM/MINM of 25 is required. The objective is to be always able to transmit the nominal power of the tractor engine and to obtain a drive with as few shifting stages for the drive range as are required. The tractor should also be able to use the optimal operating point of the engine in the partial load operational range, with minimum fuel consumption. Apart from a continuously variable propulsion drive, a continuously variable drive of the power take-off shaft is also desired.

The present invention is therefore based on the problem of specifying and refining a drive system and an agricultural vehicle of the type mentioned above with which the aforementioned problems can be overcome. In particular, electrical components are to be connected to an optimized combination of gear assemblies in order to obtain optimized drive characteristics.

The problem is solved according to the invention by the teaching of Claim 1. Additional advantageous configurations of the invention follow from the subordinate claims.

According to the invention, a drive system of the type mentioned above comprises at least one electric generator and a first and a second electrical machine. The at least one electric generator can be driven by a torque generated by an engine of the vehicle. At least one of the two electrical machines can be driven by the electric power generated by the electric generator. The mechanical torque generated by the first and/or second electrical machine can be transmitted to at least one drive axle of the vehicle to propel it.

Since an electric drive permits continuously variable driving over a large speed range, it was first recognized according to the invention that a continuously variable propulsion drive can be obtained if, in a first operating mode, only the first electrical machine, for example, transmits the mechanical torque it generates to the drive axle of the vehicle for propulsion. In another operating mode of the vehicle, both the first and the second electrical machine could transmit the sum of the generated mechanical torques to the drive axle of the vehicle for propulsion. In that way, a continuously variable drive can be realized in a particularly favorable way even without using a continuously variable transmission. A transmission with only a few shifting stages could be inserted between the two electrical machines and the drive axle in order to convert the rotational speeds produced by the electrical machines to the currently required rotational speeds of the drive axle or drive wheels.

Drive systems are known from prior art in which each wheel is driven by its own electrical machine. For tractors in particular, these electrical machines must be over-dimensioned with respect to the maximal output power in order to handle any peak loads that may occur. Such an over-dimensioning of the electrical machines can be avoided in a particularly advantageous manner with the concept of the invention, since the wheels of one axle and/or the wheels of two axles can be driven with one electrical machine or with two coupled electrical machines individually or in combination, and accordingly, even in case of vehicle load peaks, an appropriate dimensioning of the drive power that develops can be provided by selection of the electrical machine or machines used for propulsive operation.

Since electrical machines are fundamentally capable of fast and precise regulation, the speed of the utility vehicle can also be continuously variably regulated with them in a particularly favorable manner. Reversing (i.e., from forward motion of the vehicle to backward motion in particular) is possible in a continuously variable way on the one hand, and without mechanical gear shifting on the other, which considerably increases the usability of a utility vehicle with a drive system according to the invention. In principle, the maximum backward drive speed of the utility vehicle can be just as high as the maximum forward speed, but could be limited for safety reasons to 30 km/h, for instance.

Individual electrical components, such as one of the two generators or an electric machine or additional auxiliary units, can be switched off to minimize losses, particularly in the partial load operating range of the vehicle, or when a defective vehicle is being towed. Any clutches available can separate the wheels from the drive system. Moreover, the maximum speed of the vehicle can be achieved even without the highest rotational speed of the engine, by converting the mechanical power of the engine into electric power by means of at least one electric generator and driving the first and/or second electrical machine with this electric power at a suitable rotational speed. The inventive drive system makes it possible to control the rotational speed of the engine separately from and independently of the electrical machine, or separately from and independently of the rotational speed of the electrical machine, i.e., a decoupling of the engine setting from the achievable utility vehicle speed.

By using a common control and/or regulating unit for the engine, the at least one electric generator and the two electrical machines, it is possible to realize a drive power management of the utility vehicle that is capable of reacting quickly to load changes of the utility vehicle, and with which a minimized power or fuel consumption can be achieved, at least in the most frequently intended operating modes of the utility vehicle.

According to a particularly preferred embodiment, the at least one drive axle of the vehicle is mechanically drivable only by the first and/or second electrical machine. According to this embodiment therefore, it is explicitly not provided for the drive axle to be directly driven mechanically by the engine. In concrete terms, the drive system of the vehicle could be configured such that one drive axle (the rear axle, for example) of the vehicle can be driven solely by one electrical machine and that the other drive axle (the front axle, for example) of the vehicle can be driven solely by the other electrical machine. For this purpose, a multi-stage mechanical transmission, with which appropriate torque connections can be produced between one electrical machine and the first drive axle, as well as between the other electrical machine and the additional drive axle, can be inserted into the drive system. In this way the wheels of the front axle can be driven at a different wheel speed than the wheels of the rear axle in a particularly advantageous manner, so that, for instance, the turning circle of a tractor equipped with the invented drive system at turnaround can be reduced (pull in turn). Alternatively, the two drive axles of the vehicle can be driven only by the first and the second electrical machines. This could likewise be accomplished by a multi-stage mechanical transmission inserted between the two electrical machines and the two drive axles, the transmission being constructed such that appropriate torque connections can be produced. In this way, the wheels of both axles (e.g., the front axle and the rear axle) of a vehicle equipped with the invented drive system can be driven at equal speed.

For agricultural vehicles and particularly for tractors, a favorable configuration of the invented drive system can be achieved if the first and the second electrical machines have a substantially comparable maximum output power, or a substantially comparable power characteristic. In other words, two identical electrical machines could be used. If two electric generators are used, the first and the second electric generator could have a substantially comparable maximum electric power output, or a substantially comparable power characteristic.

It is particularly preferable if the mechanical torque generated by the first and/or second electrical machine can be transmitted to a multi-stage transmission. Mechanical torque can be output by the multi-stage transmission to at least one drive axle of the vehicle. In other words, the multi-stage mechanical transmission is interposed between the two electrical machines and the drive axle in terms of torque flow. The drive axle of the utility vehicle is preferably the rear axle.

In concrete terms, the transmission has a first input interface, constructed in particular in the form of an input shaft. The first electrical machine comprises a first output shaft, which is connected to the first input interface of the transmission. The transmission has a second input interface, constructed in particular in the form of an input shaft. The second electrical machine comprises a second output shaft, which is connected to the second input interface of the transmission. Thus the mechanical torque generated with the first electrical machine can be transmitted to the transmission via the first input interface. The same applies to the second electrical machine and the second input interface of the transmission.

Since the rotational speeds of the two electrical machines can be controlled such that a synchronous power summation at equal rotational speeds of the two electrical machines can be performed directly, it is particularly preferred be able to couple the first output shaft of the first electrical machine to the second output shaft of the second electrical machine by means of a clutch, for instance. In particular, this can be done with a direct clutch connection between the two drive shafts with the aid of a summing transmission. Since the two electrical machines can be symmetrically matched to one another with regard to their rotational speed or torque, shock-free shifting between the two electrical machines is possible, which particularly advantageously increases the driving comfort of an operator.

The transmission could have at least one output interface, preferably two output interfaces. The first and/or the second input interface of the transmission can be reversibly coupled to a first and/or a second output interface. This can be accomplished by means of a clutch. Hydraulically operable multi-plate clutches or clutches operable by means of a respective actuator can be considered for this.

Particularly for an agricultural vehicle constructed in the form of a tractor, the transmission preferably has two or at least three differently adjustable transmission shifting stages. Thereby two, three or more different operating modes of the utility vehicle or the tractor can be realized, each continuously variably controllable since the electrical machines used for driving the utility vehicle are themselves continuously controllable with regard to their rotational speed, and are directly connected for instance, by means of the transmission's input interfaces.

A compact construction of the entire drive system can be achieved particularly if the first and second generator are arranged substantially one after the other, in regard to the spatial arrangement of these components relative to the engine. In concrete terms, the serial arrangement of the engine and the electrical machines is relative to the direction of the vehicle's longitudinal axis. A generator has a rotor rigidly connected to a shaft, and a stator. The rotor of the first generator and the rotor of the second generator could then be driven by the same shaft. Alternatively the first generator can be driven by one shaft and the second generator by another shaft, the two shafts being arranged substantially coaxially.

A simple and thus economical construction can be achieved by rigidly connecting the rotors of the first and the second generator to a shaft driven by the engine.

In principle, the generators can be mechanically decoupled from the engine by means of appropriate clutches, for instance. It is preferably provided, however for the rotors of the first and the second generator to co-rotate via an output shaft whenever the engine is running. In order that electric power not be generated constantly, despite the fact that it is not being used under certain circumstances, it is provided for the first and/or the second generator to be electrically activated or deactivated.

In order to achieve a compact construction, it can be additionally useful for the first and the second electrical machine to be arranged substantially one after the other with regard to their spatial arrangement relative to the engine. In concrete terms, the serial arrangement of the engine and electrical machines is relative to the direction of the vehicle's longitudinal axis. An electrical machine has a rotor rigidly connected to a shaft, and a stator. The output shaft of one electrical machine could have a hollow shaft that is arranged coaxially to the output shaft of the second electrical machine. This allows a direct serial arrangement of the two electrical machines.

In a particularly preferred embodiment, the engine, the at least one generator and the two electrical machines are arranged directly adjacent to one another. With respect to the order, it is advantageous to arrange the at least one generator spatially between the engine and the two electrical machines. In this manner the electrical components, i.e., the at least one electric generator and the two electrical machines, can be cooled by a common cooling unit.

If the invented drive system is used for a tractor, a mechanical interface, in particular in the form of a power take-off, is provided by means of which mechanical torque can be transmitted from the engine or from the transmission or from an electrical machine to a mechanically drivable implement adaptable to the tractor.

Thus it is particularly favorable to provide a clutch with which the mechanical interface can be connected to the engine and/or to at least one electrical machine. This can be, for instance, a direct coupling between a shaft driven by the engine and the mechanical interface, i.e., the power take-off. Alternatively or additionally, this can be a direct coupling between the at least one electrical machine and the mechanical power take-off. Therefore no summing transmission is necessary, since the rotational speed of the electrical machine can be set to the instantaneous rotational direction and rotational speed of the engine and/or the mechanical interface.

If the mechanical interface is exclusively connected to the engine or a shaft driven by the engine, the rotational speed transmitted to the mechanical interface is dependent on the rotational speed of the engine. Alternatively, the mechanical interface can be connected only to one electrical machine. Due to the rotational speed control of the electrical machine independently of the rotational speed of the utility vehicle engine, the mechanical interface can be operated with a constant rotational speed or with a variable rotational speed, dependent, for instance, on the travel speed of the utility vehicle (traveling power take-off). For this purpose, an appropriate control unit and at least one travel speed sensor are necessary.

As an additional alternative, torque can be transmitted to the mechanical interface by a shaft driven by the engine and by one or two electrical machines. In this operating state it is possible, for example, to transmit the entire power of the engine to the mechanical interface (power take-off), branching off the power via the at least one electrical machine, wherein the rotational speed of the engine can be particularly advantageously adjusted so that a minimized fuel consumption is achieved for this operating mode.

In the latter case it is particularly advantageous to provide a summing transmission, with which mechanical torque from the engine and from at least one electrical machine can be summed-up and transmitted to the mechanical interface. This summing transmission could comprise, for instance, a planetary gear and could be coupled to the transmission.

It is particularly preferred, likewise mainly for utility vehicles constructed in the form of a tractor, for the transmission to have a second output interface via which torque can be transmitted to an additional drive axle, in particular, a front axle of the utility vehicle. This is ideally accomplished in such a manner that torque can be transmitted with the aid of the transmission from the first electrical machine to the first drive axle, and torque can be simultaneously transmitted from the second electrical machine to the additional drive axle such that the front axle and the rear axle can be driven with different rotational speeds or torques. The transmission is to be constructed appropriately for this purpose.

In another expansion stage of the transmission, it has a third output interface that can be coupled, via a summing transmission, for example, to a shaft drivable by the engine. Thereby a torque coupling between the engine and at least one electrical machine onto the third output interface is possible with the aid of the transmission.

The engine preferably comprises an internal combustion engine, a diesel engine or a fuel cell.

An electric generator and/or an electrical machine preferably comprises an asynchronous machine or a DC/DC permanent magnet machine (synchronous machine), or operates according to these principles. Thus at least one inverter or DC converter could be provided. Since the electric current is generated by at least one electric generator that is driven by the engine of the utility vehicle, and the engine has a variable rotational speed depending on the respective travel situation of the utility vehicle, the alternating current generated by the electric generator has a variable frequency. Such an AC converter could serve to convert the electric alternating current of variable frequency into an alternating current with a predetermined, substantially constant frequency. With the AC converter the variable-frequency alternating current generated by an electric generator could be first converted into direct current and then into an alternating current with the predetermined frequency. Then the electrical machine or other electrical components, for example, could be driven by this alternating current. A DC circuit with at least one electric storage device is preferably provided. This DC circuit is supplied by the inverter and could serve, so to speak, as an intermediate circuit to which electrical loads that are driven by direct current can also be connected. The electrical storage device could be embodied in the form of battery or appropriately dimensioned capacitors for example.

It is likewise particularly preferred to provide at least one additional inverter with which the direct current can be converted into an alternating current with a predetermined frequency or a predetermined waveform of variable frequency. Hereby at least one electrical load driven by alternating current can be operated.

With respect to an agricultural vehicle, the problem mentioned above is solved by the characteristics of Claim 25. According to the latter, an agricultural vehicle according to the invention comprises a drive system according to one of Claims 1-24. A first operating mode is provided in which the engine, the at least one generator, the at least one electrical machine and/or the transmission are controlled by means of a control unit in such a manner that the vehicle moves at a speed of 0-10 km/h. This operating mode exists in a tractor when the highest traction force of the tractor is required, for example, when plowing. In particular, the power produced by the engine and/or electrical machine can be transmitted to at least one drive axle.

Preferably, a second operating mode is provided in which the engine, the at least one generator, the at least one electrical machine and/or the transmission are controlled by means of a control unit such that the vehicle moves at a speed of 0-17 km/h. This operating mode is provided for fieldwork of the tractor in which maximum traction forces do not appear. In particular, the power generated by the engine and/or electrical machine can then be transmitted to at least one drive axle and/or to the mechanical interface.

Additionally, a third operating mode can be provided in which the engine, the at least one generator, the at least one electrical machine and/or the transmission are controlled by means of a control unit such that the vehicle moves at a speed of 0-60 km/h. This operating mode serves, in particular, for transport processes of the tractor on roads. In particular, the power generated by the engine and/or the electrical machine is transmitted to at least one drive axle with a high rotational speed, and the mechanical interface is generally disconnected.

The above-mentioned operating modes will be further explained in the context of a description of figures for concrete embodiments.

In a particularly preferred embodiment, the at least one generator, the first and second electrical machine and the transmission can be controlled by a control unit such that the engine can be operated at least in large part in a power range with favorable fuel consumption, in which for instance, as little fuel as possible with an optimally high rotational speed or torque output for driving is possible. It is particularly favorable in this case that the utility vehicle or the tractor can be operated economically and cost-effectively.

As already indicated, a fourth operating mode, in which up to 100% of the output power of the engine and possibly of the two electrical machines can be output to the mechanical interface, is provided in an additional expansion stage of the utility vehicle. A corresponding embodiment in this regard will also be discussed in the description of figures.

With the drive system constructed in the invented manner or with one or more favorable embodiments, a number of advantages can be achieved. For instance, a lower overall expense for electrical components and transmission components results. Increased reliability due to few components can be achieved. If the electrical components are installed in a high position in the tractor, then the required electrical safety can be guaranteed, for instance, when driving in high water. No excess dimensioning of the electrical drives for very different axle loads is necessary. There is essentially no reactive power in the transmission. It is possible to avoid a complicated individual wheel control, which can create problems particularly in case of rapidly changing coefficients of ground friction at individual wheels, e.g., between dry asphalt and ice. If a conventional central drive is used, it is possible to switch to axle drive in order to increase the front end speed for smaller turning radii, whereby the turning circle (pull in turn) of the tractor can be reduced. High travel stability at different coefficients of friction without swaying of the vehicle is possible. A creeping function is possible. The overall losses of electric components and transmissions are similarly low as those for prior-art drives with synchronous shifting transmissions, which implies low losses. Currently available transmission components and axles, e.g., front axles and rear axles with bevel gears and planetary final drives, can be used.

Figure 7:
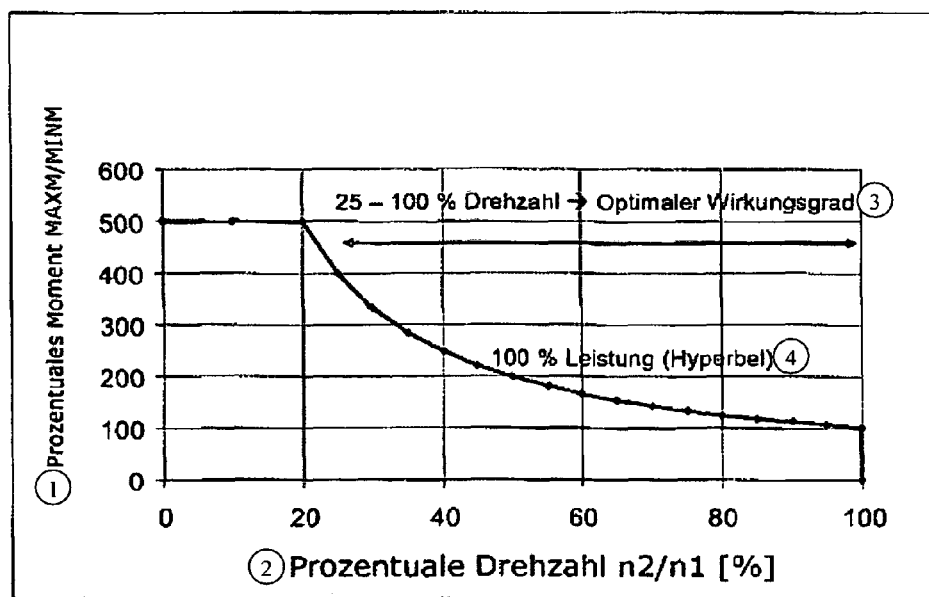
Figure 8:
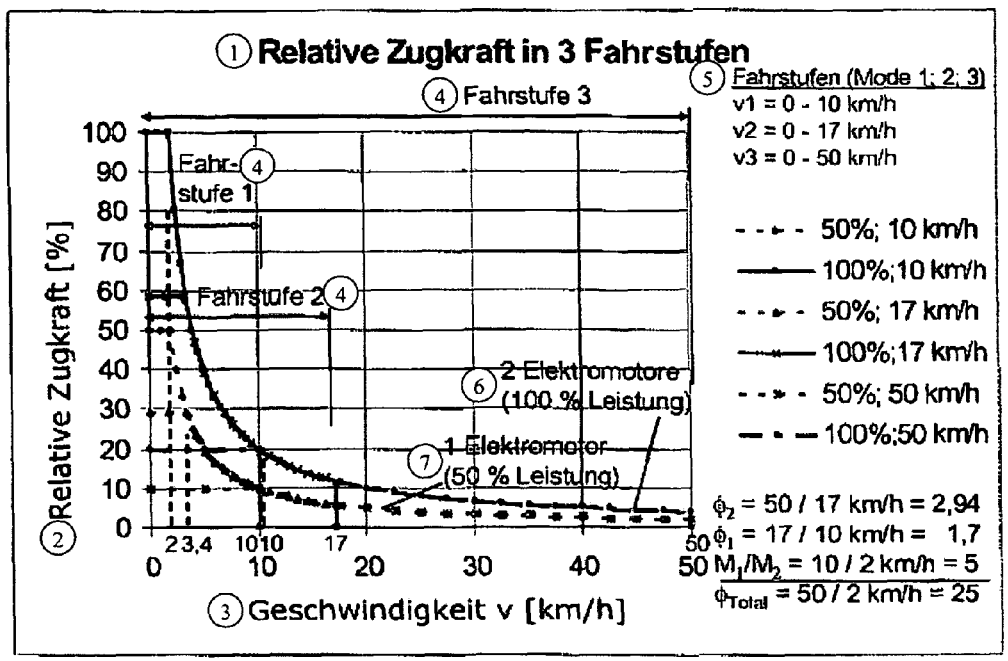

There are various manners of advantageously implementing and refining the teaching of the invention. In this regard, the reader is referred, on the one hand, to the claims subordinated to Claim 1, and on the other, to the explanation below of preferred embodiments of the invention on the basis of the drawing. Preferred embodiments and refinements of the invention will be discussed in general in conjunction with the explanation of preferred embodiments of the invention on the basis of the drawings. In the drawings, each in a schematic representation, FIG. 1 shows a basic configuration of an embodiment of the drive system according to the present invention;

FIGS. 2-6, a respective embodiment of a drive system according to the invention;

FIG. 7, in a diagram, the correlation of the torque ratios of an electric motor as a function of the percentage of the maximum rotational speed at which the electric motor is driven; and FIG. 8, in a diagram, the relative traction force of the electrical machines in three provided transmission ranges.

The configuration according to the invention of a drive system 10 of an agricultural vehicle, more particularly a tractor 12, is shown in a schematic overview in FIG. 1. Tractor 12 comprises a front axle 14 and a rear axle 16, wherein two wheels 14A, 14B and 16A, 16B are respectively associated with front axle 14 and rear axle 16. The tractor shown in FIG. 1 comprises a driven front axle 14 with a (front axle) differential 18. Rear axle 16 is also driven and comprises a (rear axle) differential 20. Tractor 12 has an internal combustion engine 22 that generates a mechanical torque and outputs it to the other components in drive system 10. In drive system 10 according to FIG. 1, two electric generators 24, 26 are provided, which can be driven by the mechanical torque produced by internal combustion engine 22. Also provided are two electrical machines 28, 30, which generate a mechanical torque that can be transmitted to transmission 32 and thus differential 20 of rear axle 16 or to differential 18 of front axle 14. An AC/DC converter 34, which converts the alternating current produced by electric generator 24 into direct current and makes it available to a first intermediate circuit 36, is associated with first electric generator 24. An AC/DC converter 38, which converts the alternating current produced by electric generator 26 into direct current and makes it available to a second intermediate circuit 40, is correspondingly associated with second electric generator 26. A DC/AC converter 42, which is connected to second electrical machine 30 and converts the direct current of first intermediate circuit 36 into alternating current at the specified frequency, is provided to first intermediate circuit 36. Electrical machine 30 is driven by the alternating current converted by converter 42. A DC/AC converter 44, which is connected to first electrical machine 28 and converts the direct current of second intermediate circuit 40 into alternating current at the specified frequency, is correspondingly provided to second intermediate circuit 40. Electrical machine 28 is driven by the alternating current converted by converter 44. Internal combustion engine 22, electric generators 24, 26 and electrical machines 28, 30 are arranged one behind the other relative to the vehicle's longitudinal axis 45.

Sensors for rotational speeds of individual shafts, torques, steering angles, voltages and currents, which can be arranged directly on the respective components and generate electrical signals that can be relayed to an appropriate control unit 48, are indicated only schematically with the reference number 46. Additionally, the electrical signals generated by the operating elements 50 of tractor 12, likewise indicated only schematically, can be transmitted to control unit 48, which in turn appropriately controls internal combustion engine 22, electric generators 24, 26, electrical machines 28, 30, transmission 32, front axle differential 18 or a rear axle differential 20, first intermediate circuit 36, second intermediate circuit 40 and converters 34, 38, 44, 42. Although control unit 48 according to this embodiment controls all the above-mentioned components, it would certainly be conceivable to control one or more components by a respective control unit of their own. These control units would then have to be designed to be connectable to one another by means of a CAN bus, for example.

Figure 2:
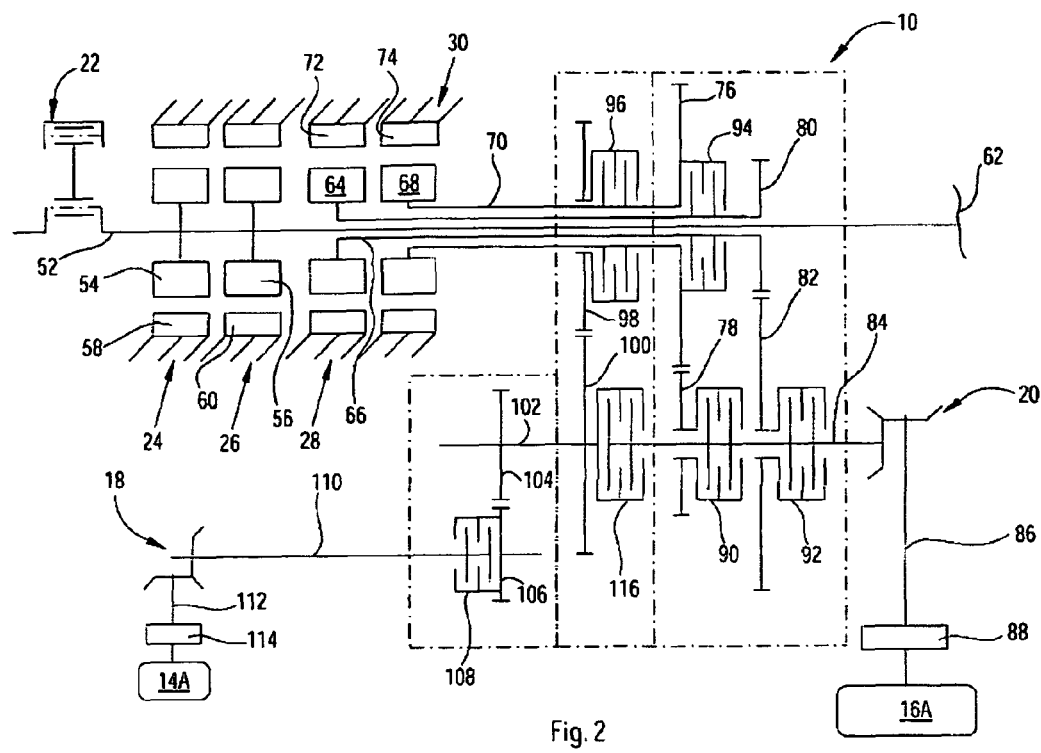

FIG. 2 shows in a schematic representation a first concrete embodiment, in which internal combustion engine 22 always drives the two rotors 54, 56 of electric generators 24, 26 mechanically via driveshaft 52. The two stators 58, 60 of the two electric generators 24, 26 are fixedly arranged on a housing, not shown in the figures. Also connected to driveshaft 52 is a power take-off of tractor 12, not shown in FIG. 2, wherein such a mechanical interface is indicated with reference number 62.

Rotor 64 of first electrical machine 28 is rotationally fixed to hollow shaft 66, which is arranged coaxially to driveshaft 52. Rotor 68 of second electrical machine 30 is rotationally fixed to a hollow shaft 70, which is arranged coaxially to both driveshaft 52 and hollow shaft 66. Stators 72, 74 of the two electrical machines 28, 30 are fixedly arranged on a housing, not shown in the figures.

Gear 76, which meshes with gear 78, with which pair a third stage of transmission 32 can be represented, is arranged rotationally fixed on hollow shaft 70. Gear 80, which meshes with gear 82 with which pair a first stage of transmission 32 can be represented, is arranged rotationally fixed on hollow shaft 66. Gears 78, 82 are rotatably arranged with respect to first transmission output shaft 84, which is connected via a bevel gear to rear axle differential 20. The form from transmission output shaft 84 transmitted to the bevel gear and the rear axle is transmitted to rear wheel 16A shown in FIG. 1 via shaft 86 of differential 20 and an intermediate planetary gear 88. Wheels 14B, 16B as well as their driveshafts are not shown in FIG. 2.

Gear 78 can be rotationally fixed to transmission output shaft 84 with the aid of clutch 90. Thereby a torque flow can be produced from second. electric machine 30 via hollow shaft 70, gear 76, gear 78, clutch 90 and transmission output shaft 84 to rear axle differential 20. Gear 82 can be rotationally fixed to transmission output shaft 84 with the aid of clutch 92. Thereby a torque flow can be produced from first electrical machine 28 via hollow shaft 66, gear 80, gear 82, clutch 92 and transmission output shaft 84 to rear axle differential 20.

Hollow shaft 70 can be rotationally fixed to hollow shaft 66 with clutch 94. Thereby first electrical machine 30 can be directly coupled to second electrical machine 28, so that gear 76 of hollow shaft 70 rotates synchronously with gear 80 of hollow shaft 66 at the same rotational speed and with the sum of the torques of the two electrical machines 28, 30. Rotors 64, 68 of the two electrical machines 30 and 28 are preferably brought to the same rotational speed before engagement of clutch 94, so that the two hollow shafts 66, 70 rotate at the same speed and an engagement of clutch 94 can take place without a shift shock in the drivetrain and thus without loss of comfort for an operator of the vehicle. Depending on whether clutch 90 or clutch 92 is engaged, a torque flow from the two electrical machines 28, 30 to transmission output shaft 84 is possible via gear set 76, 78, on the one hand, or via gear set 80, 82, on the other.

Gear 98, rotatable relative to hollow shaft 70, can be rotationally fixed to hollow shaft 70 by clutch 96. Gear 98 meshes with gear 100, which is rotationally fixed to second transmission output shaft 102. A second transmission range of transmission 32 can be represented with gear set 98, 100. Gear 104, which meshes with gear 106 and can be rotationally fixed to shaft 110 via clutch 108 in its engaged state, is rotationally fixed to second transmission output shaft 102. Shaft 110 transmits mechanical torque to the bevel gear and front axle differential 18, whereby shaft 112 drives front wheel 14A of front axle 14 via planetary intermediate gearbox 114.

If clutch 116 is engaged, shaft 84 can be rotationally fixed to shaft 102. Thereby a torque flow can be transmitted from one of gears 98, 76 or 80 to the respective meshing gears 100, 78 or 82, for example. Both shafts 84 and 102 then transmit this torque both to rear axle differential 20 and to front axle differential 18, and thus to the rear wheels 16A, 16B and front wheels 14A, 14B equally. Therefore if clutch 116 is engaged, the wheels of front axle 14 as well as those of rear axle 16 are driven in a coupled manner and dependently on one another with the same wheel circumferential speed.

If clutch 116 is not engaged, then wheels 14A, 14B of front axle 14, for example, could be driven exclusively by second electrical machine 30, in particular via rotor 68, hollow shaft 70, engaged clutch 96, gears 98, 100, shaft 102, gears 104, 106, engaged clutch 108 and shaft 110 to front axle differential 18. Rear wheels 16A, 16B of rear axle 16 could be transmitted via rotor 64 of first electrical machine 28, hollow shaft 66, engaged clutch 94, gears 76, 78, engaged clutch 90 and shaft 84 to rear axle differential 20. If clutch 116 is not engaged, then wheels 14A, 14B of front axle 14 and wheels 16A, 16B of rear axle 16 are driven independently of one another with different wheel circumferential speeds, in particular as a function of the rotational speeds of first and second electrical machines 28, 30 respectively. In this manner, for example, a small turning circle (pull in turn) at turnaround in the field can be achieved with appropriate control of the two electrical machines 28, 30.

Figure 3:
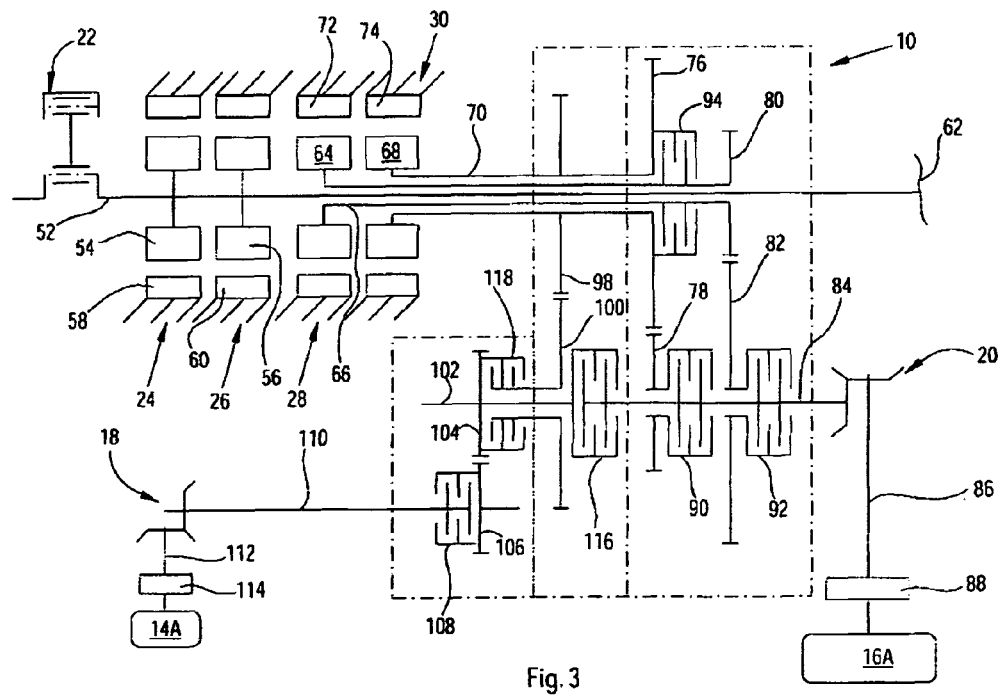

FIG. 3 shows in a schematic representation a second embodiment, which is substantially comparable in construction to that from FIG. 2. Identical or similar subassemblies are therefore labeled with the same reference numbers. Gear 98 provided in FIG. 3 is rotationally fixed in this embodiment to hollow shaft 70. Gear 100 of this embodiment is rotationally fixed to a hollow shaft that can be rotationally fixed to gear 104 via clutch 118. To that extent the function of clutch 118 from the embodiment according to FIG. 3 is comparable to the function of clutch 96 of the embodiment from FIG. 2.

Figure 4:
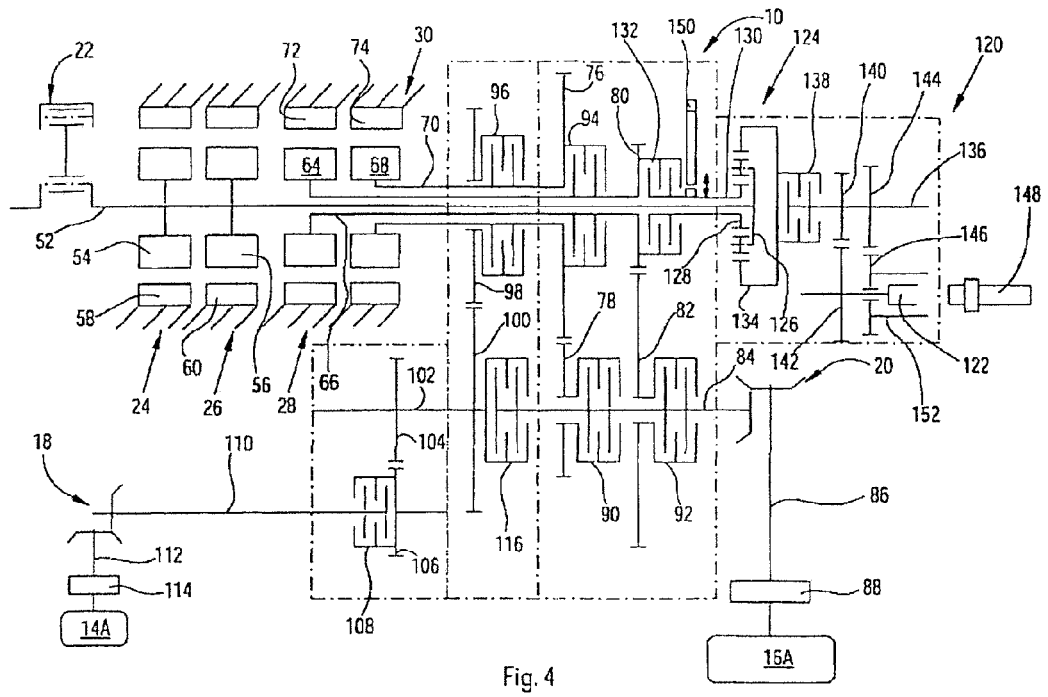

FIG. 4 shows in schematic representation a third embodiment, which is substantially comparable to that from FIG. 2. In place of mechanical interface 62 from FIG. 2, a continuously variable power take-off transmission 120 is provided with which power take-off shaft 122 or 152 can be operated. Power take-off transmission 120 comprises a planetary gear set 124. Planet carrier 126 of planetary gear set 124 is rotationally fixed to driveshaft 52. Sun wheel 128 of planetary gear set 124 is rotationally fixed to a hollow shaft 130 and can be rotationally fixed to gear 80 via clutch 132 and hollow shaft 66. The output of power take-off transmission 120 can be connected to ring gear 134 of planetary gear set 128. Ring gear 134 can be rotationally fixed to shaft 136 as long as clutch 138 is engaged.

Torque generated by internal combustion engine 22 can be transmitted via driveshaft 52 to planet carrier 126 of planetary gear set 134 and summed via hollow shaft 130 and ring gear 128 of planetary gear set 124 with the torque generated by first electrical machine 28, as long as clutch 132 is engaged. In this operating mode, a continuously variable power take-off operation of power take-off shaft 122 and 152 is possible, wherein, for instance, internal combustion engine 22 can be operated in its low engine speed range favorable for power take-off operation, with low fuel consumption. At the lower rotational speed of driveshaft 52 in this operating mode, a rotational speed summing to the required power take-off shaft rotational speed can be accomplished with the aid of first electrical machine 28. Power take-off shaft 122 allows a standardized power take-off speed of 540 rpm. Power take-off shaft 152 allows the additional standardized speed of 1000 rpm.

In addition, mechanical torque generated by second electrical machine 30 could also be transmitted via hollow shaft 70 and hollow shaft 66 to hollow shaft 130, provided that clutch 94 is likewise engaged. In this operating mode, torque generated by internal combustion engine 22 and by the two electrical machines 28, 30 is summed in planetary gear set 124. Alternatively, the torque generated by second electrical machine 30, for example, could be transmitted via gear set 76, 78 to rear axle 16 with clutches 94, 90 engaged.

The torque output from ring gear 134 to shaft 136 via clutch 138 can be transmitted via gears 140, 142 to power take-off shaft 122 or, in a different gear ratio, to power take-off shaft 152 via gears 144, 146. Reference number 148 indicates a power take-off stub shaft which is inserted into the provided recess of power take-off shaft 122 or 152 in order to change between the two rotational speeds typically used for power take-off (540 and 1000 rpm).

A detent pawl or brake 150 is provided with which ring gear 130 can be immobilized. Accordingly sun wheel 128 does not rotate in this operating mode, so that only the torque transmitted from driveshaft 52 to planet carrier 126 of planetary gear set 124 can be transmitted to ring gear 134 and ultimately to power take-off shaft 122

Figure 5:
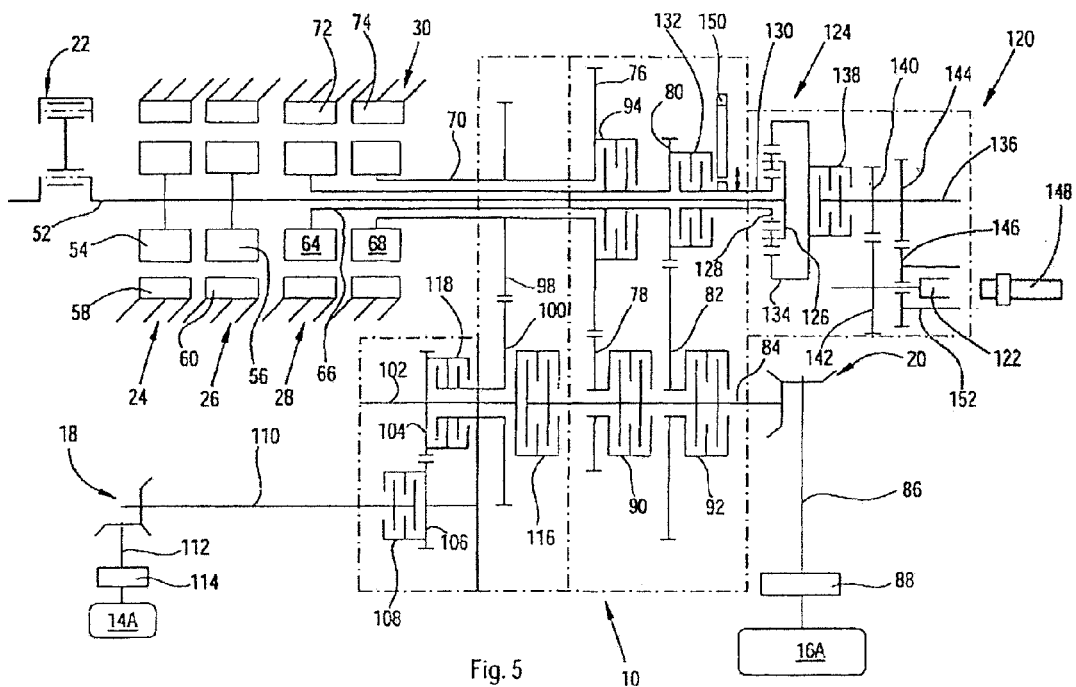

FIG. 5 shows in schematic representation an additional embodiment, which is constructed comparably to that in the embodiment from FIG. 4 with respect to the power take-off transmission 120. With regard to the remainder of the drive system, the embodiment shown in FIG. 5 is constructed comparably to that from FIG. 3. In order to avoid repetition, the reader is referred to the respective parts of the description.

Figure 6:
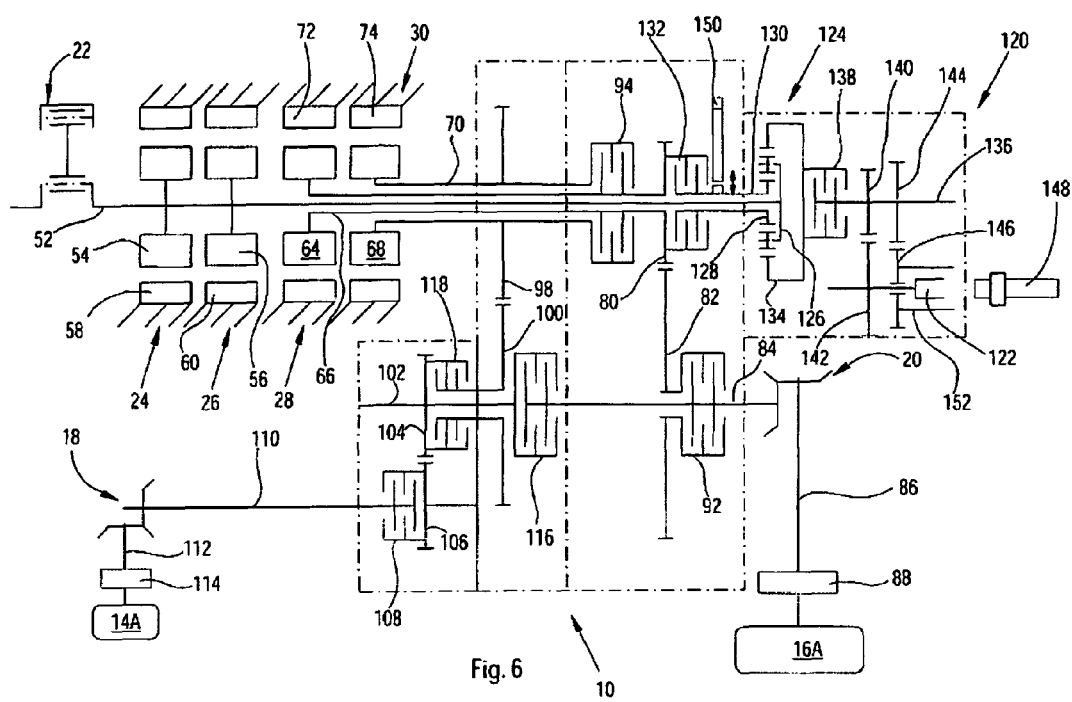

FIG. 6 shows in schematic representation an additional embodiment, which is substantially comparable to the embodiment from FIG. 5. However, the embodiment according to FIG. 6, does not comprise three transmission modes as in FIG. 5, i.e., three different transmission groups 98, 100 or 76, 78 or 80, 82. The embodiment according to FIG. 6 comprises only two transmission modes, which are formed by the two gear sets 98, 100 and 80, 82.

FIG. 7 shows in a schematic diagram the basic torque ratios of an electric motor as a function of the percentage rotational speed. The percentage torque MAXM/MINM in percent is plotted on the ordinate. On the abscissa, the percentage rotational speed n2/n1 is likewise plotted in percent. An electric motor has, for example, a maximal spread MAXM/MINM=5. The maximum torque that can be output by the electric motor at 20% of the electric motor's nominal rotational speed is five times greater than that at the nominal rotational speed of 100%. Over the speed range of 20 to 100% of the nominal speed, the torques yield the same power of the electric motor and are therefore particularly suitable as transmissions for constantly variable driving of vehicles. From zero to 20% of the nominal speed, the maximum torque of the electric motor remains substantially constant.

FIG. 8 shows in a schematic diagram the relative traction force of the two electrical machines in three possible transmission ranges or operating modes of a tractor, as shown for instance in the embodiments of FIGS. 1-5. The relative traction force in percent is indicated on the ordinate. The speed of the vehicle in units of km/h is indicated on the abscissa. One electrical machine can be shifted into a different transmission range while the other electrical machine maintains up to 50% of the respective maximum traction force. In this way a substantially shock-free shifting or changing of transmission ranges becomes possible.

In conclusion it should be pointed out in particular that the above-explained embodiments serve only to describe the claimed teaching, but it is not limited to the exemplary embodiments.

The invention claimed is:

1. A drive system for an agricultural or industrial vehicle comprising: an engine, at least one drive axle, first and second electric generators, first and second electrical machines, and a mechanical interface in the form of a power take-off shaft, wherein the first and second electric generators can be driven by a torque generated by the engine, wherein at least one of the first and the second electrical machines can be driven by electrical energy produced by the first and second electric generators, wherein mechanical torque generated by at least one of the first and the second electrical machines can be transmitted to the at least one drive axle of the vehicle for its locomotion, and wherein mechanical torque can be transmitted to a mechanically drivable implement via the mechanical interface only from one or more of the first and the second electrical machines;
   wherein the first electric generator includes a first stator and a first rotor, the first rotor being rotationally fixed to and capable of being driven by a first input shaft, and the second generator includes a second stator and a second rotor, the second rotor being rotationally fixed to and capable of being driven by a second input shaft, and wherein the first input shaft and the second input shaft are part of a single input shaft or are distinct input shafts arranged substantially coaxial to one another;
   wherein the first and second rotors always co-rotate when the engine is running, and can be electrically activated or deactivated;
   wherein the first electric machine has a first output shaft, the first output shaft being fixed to a first drive gear, the first drive gear being meshed with a first transmission gear included in a multi-stage mechanical transmission;
   wherein the second electric machine has a second output shaft, the second output shaft being fixed to a second drive gear, the second drive gear being meshed with a second transmission gear included in the multi-stage mechanical transmission; and
   wherein the first and second electrical machines are arranged substantially one after the other relative to the engine.

2. The drive system according to claim 1, wherein the at least one drive axle of the vehicle can be driven only by one or both of the first and the second electrical machines.

3. The drive system according to claim 2, further comprising a plurality of drive axles, the plurality of drive axles including the at least one drive axle, wherein one of the plurality of drive axles of the vehicle can be driven only by the first electrical machine, via the multi-stage mechanical transmission, and wherein another of the plurality of drive axles of the vehicle can be driven only by the second electrical machine via the multi-stage mechanical transmission.

4. The drive system according to claim 2, further comprising a plurality of drive axles, the plurality of drive axles including the at least one drive axle, wherein at least two of the plurality of drive axles can be driven only by the first and the second electrical machines via the multi-stage mechanical transmission.

5. The drive system according to claim 1, wherein mechanical torque received from at least one of the first and second electrical machines can be output with the multi-stage mechanical transmission to the at least one drive axle of the vehicle.

6. The drive system according to claim 5, wherein the multi-stage mechanical transmission has a first input interface constructed in the form of a first transmission shaft, the first transmission gear being connected to the first transmission shaft by a first clutch, and wherein the multi-stage mechanical transmission has a second input interface constructed in the form of a second transmission shaft, the second transmission gear being connected to the first transmission shaft by a second clutch.

7. The drive system according to claim 6, wherein the first output shaft of the first electrical machine can be coupled by means of a third clutch to the second output shaft of the second electrical machine.

8. The drive system according to claim 6, wherein the multi-stage mechanical transmission includes at least a first output interface and wherein one or more of the first and the second output shafts can be reversibly connected to the first output interface by means of at least a third clutch.

9. The drive system according to claim 6, wherein the first transmission shaft can be coupled to the second transmission shaft by a third clutch.

10. The drive system according to claim 1, wherein the second output shaft of the second electrical machine includes a hollow shaft that is arranged coaxially to the first output shaft of the first electrical machine.

11. The drive system according to claim 1, wherein at least one of the first and second generators is arranged spatially between the engine and the first and second electrical machines.

12. The drive system according to claim 1, further comprising a first clutch with which the mechanical interface can be connected to one or more of the first and second electrical machines.

13. The drive system according to claim 12, further comprising a summing transmission with which mechanical torque can be transmitted to the mechanical interface, the mechanical torque being summed-up from at least two of the first electrical machine, the second electrical machine, and a drive shaft powered by the engine wherein the summing transmission includes a planetary gear set.

14. The drive system according to claim 8, wherein the multi-stage mechanical transmission includes a second output interface via which torque can be transmitted to a front axle of the agricultural or industrial vehicle.

15. The drive system according to claim 14, wherein the multi-stage mechanical transmission includes a third output interface, the third output interface being coupled by a summing transmission to a shaft drivable by the engine.

16. The drive system according to claim 1, wherein one or more of the first electric generator, the second electric generator, the first electrical machine, and the second electrical machine includes one or more of an asynchronous machine or a synchronous machine, or operates according to a corresponding principle.

17. A drive system for an agricultural or industrial vehicle comprising:
- an engine providing mechanical power to a drive shaft;
- a first electrical generator having a first rotor and a first stator, the first rotor being rotationally fixed to the drive shaft and configured to rotate with respect to a first stator;
- a first electrical machine having a second rotor and a second stator, the second rotor being rotationally fixed downstream of the first rotor to a first hollow shaft and configured to rotate with respect to the second stator, wherein the first hollow shaft coaxially surrounds, at least in part, the drive shaft, and is fixed to a first drive gear, the first drive gear being meshed with a first transmission gear included in a mechanical transmission;
- a first clutch configured to rotationally fix the first hollow shaft to a second drive gear, the second drive gear being meshed with a second transmission gear included in the mechanical transmission;
- a second electrical generator having a third rotor and a third stator, the third rotor being rotationally fixed to the drive shaft and configured to rotate with respect to the third stator, the second electrical generator being located downstream of the first electrical generator and upstream of the first electrical machine; and
- a second electrical machine having a fourth rotor and a fourth stator, the fourth rotor being rotationally fixed downstream of the first electrical machine to a second hollow shaft, wherein the second hollow shaft coaxially surrounds, at least in part, the first hollow shaft, and is fixed to the second drive gear.

18. The drive system according to claim 17, further comprising:
- a second clutch configured to rotationally fix the second hollow shaft to a third drive gear, the third drive gear being meshed with a third transmission gear included in the mechanical transmission.

19. The drive system according to claim 17, further comprising:
- a second clutch configured to rotationally fix the first hollow shaft to a first rotating component of a planetary gear set.

20. The drive system according to claim 19, wherein the drive shaft provides rotational power to a second rotating component of the planetary gear set, the planetary gear set being thereby configured to sum rotational power from the drive shaft and the first hollow shaft.

21. The drive system according to claim 17, wherein the second hollow shaft is rotationally fixed to a third drive gear, the third drive gear being meshed with a third transmission gear included in the mechanical transmission.

22. The drive system according to claim 17, further comprising:
- a third clutch configured to rotationally fix the first hollow shaft to a first rotating component of a planetary gear set;
- wherein the drive shaft provides rotational power to a second rotating component of the planetary gear set, the planetary gear set being thereby configured to sum rotational power from two or more of the drive shaft, the first hollow shaft, and the second hollow shaft.

23. A drive system for an agricultural or industrial vehicle comprising: an engine, at least one drive axle, first and second electric generators, first and second electrical machines, and a mechanical interface in the form of a power take-off shaft, wherein the first and second electric generators can be driven by a torque generated by the engine, wherein at least one of the first and the second electrical machines can be driven by electrical energy produced by the first and second electric generators, wherein mechanical torque generated by at least one of the first and the second electrical machines can be transmitted to the at least one drive axle of the vehicle for its locomotion, and wherein mechanical torque can be transmitted to a mechanically drivable implement via the mechanical interface only from one or more of the first and the second electrical machines;
- wherein the first electric generator includes a first stator and a first rotor, the first rotor being rotationally fixed to and capable of being driven by a first input shaft, and the second generator includes a second stator and a second rotor, the second rotor being rotationally fixed to and capable of being driven by a second input shaft, and wherein the first input shaft and the second input shaft are part of a single input shaft or are distinct input shafts arranged substantially coaxial to one another;
- wherein the first and second rotors always co-rotate when the engine is running, and can be electrically activated or deactivated;
- wherein the first electric machine has a first output shaft, the first output shaft being fixed to a first drive gear, the first drive gear being meshed with a first transmission gear included in a multi-stage mechanical transmission;
- wherein the second electric machine has a second output shaft, the second output shaft being fixed to a second drive gear, the second drive gear being meshed with a second transmission gear included in the multi-stage mechanical transmission; and
- wherein the second output shaft of the second electrical machine includes a hollow shaft that is arranged coaxially to the first output shaft of the first electrical machine.

* * * * *